United States Patent
Assouad et al.

[19]

[11] Patent Number: 6,119,254
[45] Date of Patent: Sep. 12, 2000

[54] HARDWARE TRACING/LOGGING FOR HIGHLY INTEGRATED EMBEDDED CONTROLLER DEVICE

[75] Inventors: Nicolas C. Assouad, Niwot; David L. Dyer, Boulder; Wen Lin, Niwot, all of Colo.

[73] Assignee: STMicroelectronics, N.V., Netherlands

[21] Appl. No.: 08/997,130

[22] Filed: Dec. 23, 1997

[51] Int. Cl.[7] .................................................. G01R 31/28
[52] U.S. Cl. .......................................... 714/724; 714/733
[58] Field of Search .................................... 714/724, 733, 714/734, 735, 736, 737, 25, 43, 44, 45, 47; 364/490, 468.15

[56] References Cited

U.S. PATENT DOCUMENTS

| | | | |
|---|---|---|---|
| 4,725,945 | 2/1988 | Kronstadt et al. | 365/189 X |
| 5,608,867 | 3/1997 | Ishihara | 714/47 |
| 5,784,712 | 7/1998 | Byers et al. | 711/219 |
| 5,850,512 | 12/1998 | Song | 714/735 X |

*Primary Examiner*—Hoa T. Nguyen
*Attorney, Agent, or Firm*—Theodore E. Galanthay; Lisa K. Jorgenson; William J. Kubida

[57] ABSTRACT

A method of testing a processor controlled chip having embedded circuitry devoid of a direct connection external to said chip. Tracing circuitry embedded on the chip is programmed to detect the presence of specified information on a bus system embedded on the chip and devoid of a direct connection external to the chip. An address comparator detects the presence of the specified information on the bus system and opens gating circuitry in response to the detection. The specified information is extended through the gating circuitry and written in a buffer memory. The specified information can be read out of the buffer memory and extended to a user terminal external to the chip.

23 Claims, 6 Drawing Sheets

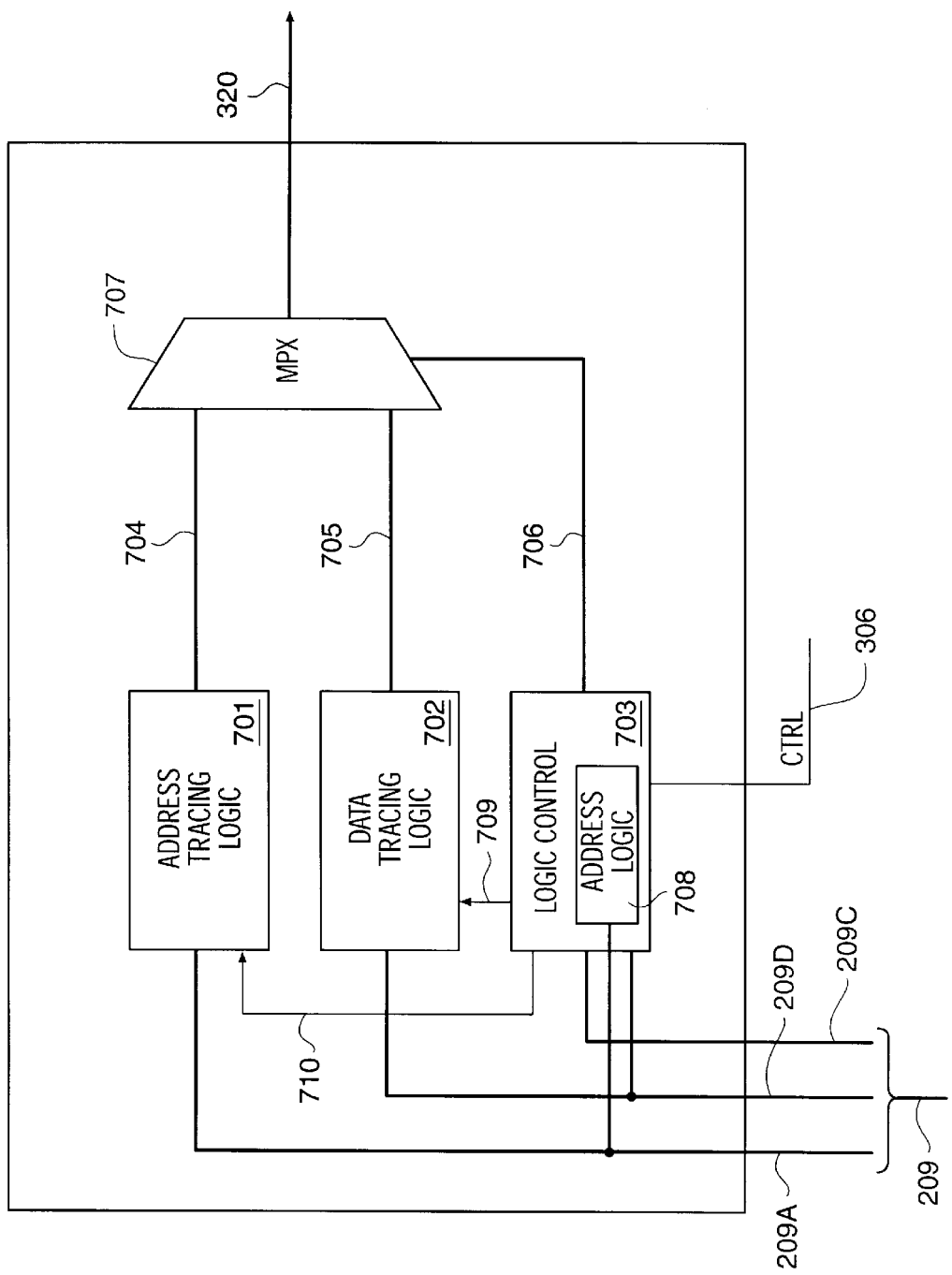

HARDWARE TRACING/LOGGING FOR HIGHLY INTEGRATED EMBEDDED CONTROLLER DEVICE

FIELD OF THE INVENTION

This invention relates to processor controlled circuitry and, in particular, to processor controller circuitry embedded on a chip in which the internal busses of the circuitry are not directly accessible.

PROBLEM

Embedded processor controller circuitry is used in various applications. One such application is an interface controller for use with computer peripheral storage devices, such as disk drives, CD-ROMs, and tape drives. A processor and a memory of the interface controller control data transfer operations between a host and the peripheral data device. In disk drive applications, the interface comprises a disk drive controller that controls data transfer operations between a disk drive and a host.

In the testing of a prototype disk controller during its development, it is necessary to trace the program flow and monitor data content on various busses during hardware and firmware development. This can be done by using an in circuit emulator. The in circuit emulator is connected to the target device (the device under test) through the processor address, data, and control buses of the target device. The in circuit emulator acts like the processor of the target device during the development and testing. The in circuit emulator provides program execution and data/program tracing function.

It is difficult to provide satisfactory hardware connections between the target device and the in circuit emulator. There are significant number of signals required to be connected from the in circuit emulator to the target device. These connections often requires expensive connectors because the processor on the target device usually has a special package footprint. Even with adequate connections to these elements, there are also noise problems on the signal lines.

Real time debugging is also difficult with the in circuit emulator because the emulator often can not match the emulated processor operation speed. As a result, the target program is executed at the emulator clock rate instead of the target circuit's clock rate.

A second method to develop the target device hardware and firmware is to trace the program flow and data content by an analyzer, such as a ROM emulator. Similar to the in circuit emulator, the ROM emulator connects to the processor address/data/control lines on the target device. The difference between the in circuit emulator and the ROM emulator is that the ROM emulator does not replace the processor function on the target device. The processor on the target device still acts as the central control unit to direct the program and data flow. The ROM emulator's function is to trace the address and data buses signals while the target processor is in execution. A control program in the ROM emulator translates bits/bytes information into the original source code of the tested circuit so engineers can debug the code. This reduces cost significantly from the first method because the ROM emulator does not provide the processor function. This ROM emulator method also provides an improved product real time debugging capability.

Multiple chips were formerly used in a target product and were combined into single chip as the technology advanced. The traditional stand alone processor was also combined into the single chip along with other electronics parts on the target device. The external program and data busses then become internal to the chip. Because of the cost and packaging limitation on the input/output pin count on a single chip device, the program and data buses and some control signals are no longer available for program or data tracing. As the result, development testing on the product become extremely difficult.

As a temporary solution, specific events or data are stored into a buffer memory by the firmware control on the target device. This information then can be retrieved and analyzed to understand the device operation. However, there is a major drawback on this approach. It requires additional firmware and processor time to fetch and process the traced data. All data tracing and logging processes with the data buffer is controlled by the microprocessor in real time. This additional processes reduce the amount of time the processor has to perform it's normal operations. As the result, it changes the code execution timing so that a problem that exists in a real time mode may not be re-produced in the debug mode timing.

SOLUTION

The above and other problems are solved and an advance in the art is achieved by the present invention which is directed to internal tracing control circuitry embedded on the same chip containing the target device. The embedded tracing hardware on the process controller chip is controlled by the embedded firmware. Upon powering up the target device, the embedded firmware initializes the tracing control logic to a preset condition. The tracing feature can initially be disabled as the preset condition. With the embedded firmware, the tracing feature can be enabled through a serial port or a standard industrial interface such as an ATA (AT Attachment) interface or other technique. The enabling function can be done by sending the request through the interface by a computer terminal.

The traced information is written into a buffer memory through an embedded buffer memory manager. The buffer memory manager supports multiple data ports access on the target device. In addition to a trace data port created by the invention, there are disk, host, servo, ECC, and microprocessor ports existing on a normal computer storage device such as a disk drive. The buffer memory manager also provides priority control for these data ports, so that time critical data will be transferred in and out of the buffer memory first. Non-time critical data, such as data accessed by the microprocessor and host port will be scheduled after the time critical data is processed. Each data port also provides data FIFO (first in first out buffering device) to prevent any data loss due to port's lower priority accessibility. With this automatic control mechanism, the traced data can be logged into the buffer memory in real time without the microprocessor intervention. As the result, the trace function of the invention will not interfere the regular device operations.

The tracing buffer memory of the present invention is a section of data buffer memory normally used for the target product's normal operations. For a disk drive device, the normal operations are reading and writing data in and out the disk. A dedicated section of the data buffer memory is allocated for the tracing function during the debugging development stage. The allocation can be implemented by set a BOS (beginning of memory segment), EOS (end of memory segment), LPR (last view pointer), and TPR (trace pointer) pointers. The trace pointer points to the next free buffer memory location for the next tracing data operation. The trace pointer loads the BOS content if it passes the EOS. The last display pointer points to the last viewed traced content. A flexible size of circular tracing data buffer memory is created with these pointers supports. This circular buffer then can be used to trace all the internal interface controller activities.

To view the traced data stored in buffer memory, the same computer terminal used to enable the tracing control logic operation can be used again. With the embedded firmware control, the target device processor receives the tracing request from the terminal. The processor then fetches the traced data from the buffer memory through the microprocessor port. The trace data is transmitted to the terminal via the serial port or an industrial standard interface. Depending on the target device firmware implementation, raw traced data stored in the data buffer can be processed internally in the target device or processed after the data is transmitted to the computer terminal. It is preferable to decipher the raw traced data content with the computer terminal program because of the target device program space constraints.

Viewing the data in the trace buffer memory is normally not a time critical task compared with the read and write function on a target device such as a disk drive device. Because the traced data is for hardware and firmware debugging purposes, the traced data can be processed in a non-real time mode. The embedded processor can be used to fetch the data from the buffer memory and transfer the data to the terminal. However, if the real time mode is desired, the traced data can be fetched through a data port and then can be automatically transferred to the computer terminal without target processor intervention. One such data port that can be used for this transfer is the host data port. If there are no host transfer activities, the host port can be used to transfer traced data to a computer terminal with a standard industrial interface. If the host port is not available, an additional data port can be created for this purpose. The traced data then can be transferred to a terminal through a serial port interface without target processor intervention.

Normally a target device such as a disk drive provides a memory data buffer of sufficient size for host and disk data transfer. Since the memory is already available, the allocation of a small section of this memory will not affect the normal device operation. It is more desirable to use this memory data buffer for storing the traced data compared to a dedicated tracing memory. If the target device does not have sufficient size of data buffer for tracing (such device may have a small size data buffer memory during regular use), a larger data buffer memory may be used only during the hardware and firmware debugging development stage. Once the debugging process is completed, the target device can be delivered to user with normal size buffer memory.

The present invention can be applied to all single chip embedded processor controlled circuitry applications. It is not limited to processor controlled peripheral data storage controller devices. It can be used for all embedded circuitry having debugging limitations.

DESCRIPTION OF THE DRAWINGS

These and other advantages and features of the invention maybe better understood from a reading of the following detailed description taken in conjunction with the drawings in which:

FIG. 7 discloses further details of tracing control logic 302.

DETAILED DESCRIPTION

Figure 1:
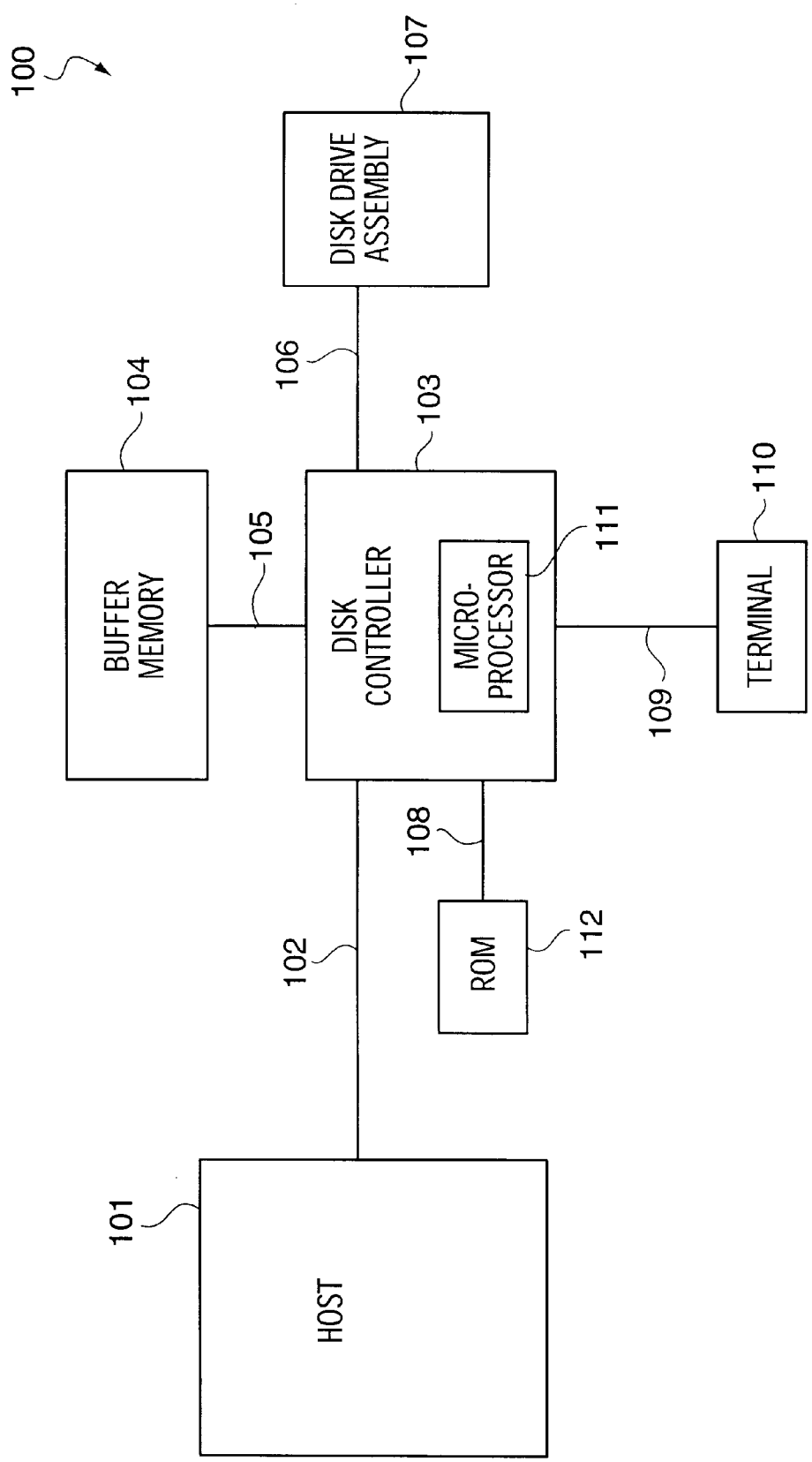
FIG. 1 discloses a system embodying the invention.

Description of FIG. 1

FIG. 1 discloses a computer controlled system 100 comprising host 101, disk controller 103 and disk drive assembly 107. The system of FIG. 1 further includes buffer memory 104, ROM 112 and terminal 110. Host 101 is connected by path 102 to disk controller 103. Disk controller 103 is connected by path 106 to disk drive assembly 107. Host 101 may comprise a computer, such as a personal computer, that communicates via disk controller 103 with a bulk data storage device such as disk drive assembly 107. Host 101 sends write commands and data via disk controller 103 to disk drive assembly 107 to write data onto the medium comprising the disk drive assembly. Host 101 may also send read commands via disk controller 103 to disk drive assembly 107 to retrieve priorly written data the host requires. On both read and write operations, the data transmitted from the host via the disk controller to the disk drive assembly includes an identity of the location on the disk drive assembly that contains the data that is to be retrieved on a read operation or to be written on a write operation. This data may comprise an identification of the cylinder, track and sector to which the new information is to be written or from which priorly written information is to be retrieved.

The data that is exchanged between host 101 and disk drive assembly 107 does not pass instantaneously through disk controller 103. Instead, the data to be exchanged is received by disk controller 103, temporarily stored in buffer memory 104 and then subsequently transmitted to the destination circuit, i.e. disk drive assembly 107 or host 101. Buffer memory 104 is used for this purpose because of the different speeds at which host 101 and disk drive assembly 107 operate. Host 101 operates and applies data to path 102 at a first data rate while disk drive assembly 107 operates at a different data rate.

Terminal 110 is provided in accordance with the present invention to provide a user with direct access to the internal circuitry, such as microprocessor 111, within disk controller 103. These connections are shown in greater detail on the subsequent drawing Figures. The purpose of terminal 110 is to facilitate testing and diagnostic operations of the disk controller during design and development of the disk controller. ROM 112 functions as subsequently described and permanently stores the programs needed by microprocessor 111 to control the operation of the disk controller.

Figure 2:
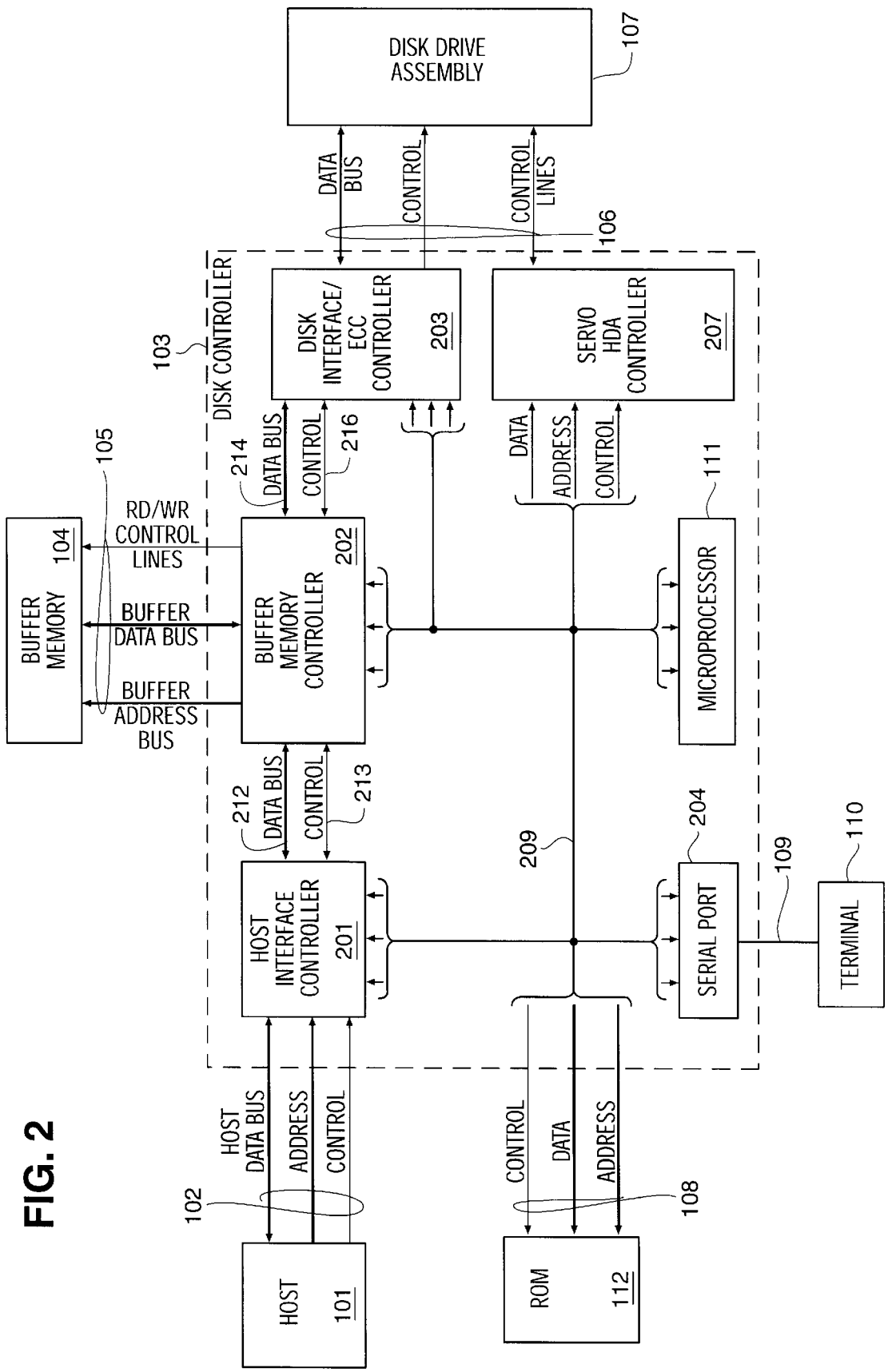
FIG. 2 discloses further details of disk controller 103 of FIG. 1.

Description of FIG. 2

Disk controller 103 is shown in further detail on FIG. 2 as comprising buffer memory controller 202, host interface controller 201, program memory controller 211, serial port 204, microprocessor 111, disk interface/ECC controller 203, servo controller 207, and a bus system 209 which interconnects these circuits for the exchange of signals necessary in the operation of disk controller 103. The bus system 209 includes a control bus, an address bus, and a data bus.

The operation of disk controller 103 is controlled by microprocessor 111 which exchanges signals over bus system 209 with the various circuits comprising disk controller 103.

In operation, disk controller 103 on FIG. 2 receives read and write requests from host 101 via the bus 102 and host interface controller 201. Each received request is transmitted over bus system 209 to microprocessor 111. In serving these requests, microprocessor 111 communicates with host interface controller 201 and buffer memory controller 202 via the bus system 209 to cause the data received by host interface controller 201 to be extended via data bus 212 and control bus 213 to buffer memory controller 202. Buffer memory controller 202 then sends the required signals over the address and control bus of bus system 105 to cause buffer memory 104 to write the data on the data bus of bus system 105 into buffer memory 104. This data is temporarily stored in buffer memory 104 and then subsequently transmitted to disk drive assembly 107.

The following describes how the data temporarily stored in buffer memory 104 is transmitted to disk drive assembly 107. The first step in this operation is that buffer memory controller 202 reads the host data out of buffer memory 104 and transmits the necessary data and control signals over busses 214 and 216 to disk interface/ECC controller 203. This circuit extends the data over the data bus of bus system 106 to disk drive assembly 107. Disk drive assembly 107 also receives control signals over the control busses of bus system 106. Disk drive assembly 107 performs the operations required to write the data received onto the appropriate portion of the disk drive assembly. The information received by disk drive assembly 107 to perform this operation includes servo information from servo controller 207. This circuit provides the function of providing spindle position, VCM, demodulator timing controller, gray code and position analog data acquisition as required by the disk drive assembly to perform the function requested by the host.

The preceding has described the receipt by disk controller 103 of a request from the host and how this request is served by disk controller 103. If the host request is a write operation, the data specified by the host is written into disk drive assembly 107 as above described. If the host request is for a read operation, the request is served in much the same manner except that the signals received by disk interface/ECC controller 203 and servo controller 207 cause the data requested by the host to be read by disk drive assembly 107 and transmitted via disk interface/ECC controller 203 to buffer memory controller 202. This information is then temporarily written into buffer memory 104 following which it is read out of the buffer memory and transmitted through host interface controller 201 and over path 102 to host 101.

Microprocessor 111 performs the operations required of it in response to the reception of a host request as above described. In so doing, microprocessor 111 operates under control of programs stored in ROM 112.

Figure 3:
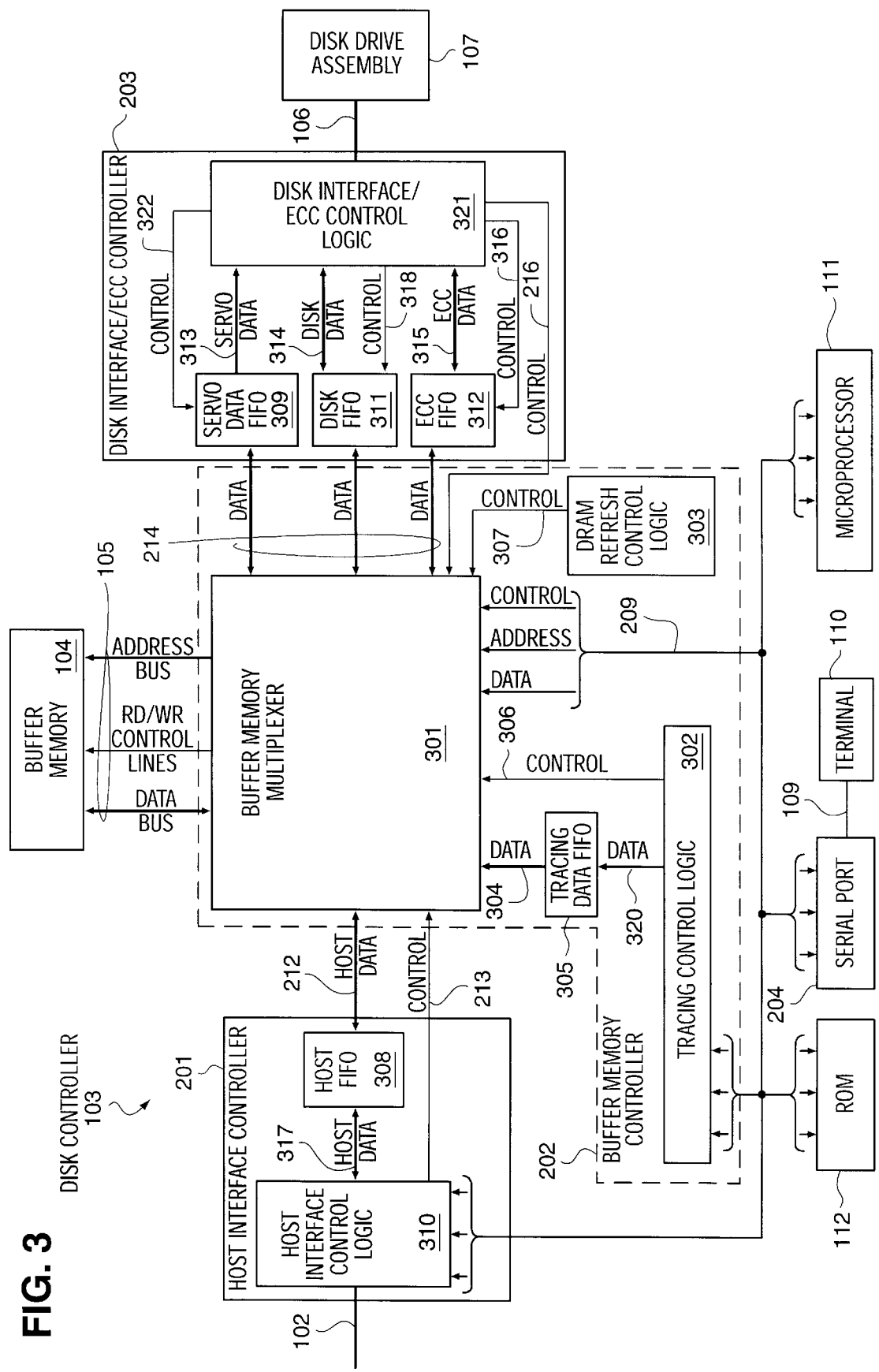
FIG. 3 discloses further details of buffer memory controller 202 of FIG. 2.

Description of FIG. 3

FIG. 3 discloses further details of disk controller 103. Disk controller 103 is shown as comprising buffer memory controller 202, microprocessor 111, serial port 204, host interface controller 201 which comprises host interface control logic 310 and its associated host fifo 308, disk interface/ECC controller 203 and its fifo's 309, 311, and 312 and disk interface/ECC control logic 321. The system of FIG. 3 further includes buffer memory 104 connected by bus system 105 to buffer memory controller 202.

Buffer memory controller 202 includes buffer memory multiplexor 301, tracing control logic 302 and its associated fifo 305 and DRAM refresh control logic 303. Buffer memory multiplexor 301 is connected to buffer memory 104 by bus system 105. It is further connected to host interface control logic 310 by host fifo 308 and bus 212. It is further connected to fifo's 309, 311 and 312 by paths 214. It is further connected to ROM 112 and microprocessor 111 and terminal 110 by bus system 209.

It has already been described how the serving of a host write request involves the transmission of data from host 101 to disk drive assembly 107 via host interface controller 201, buffer memory controller 202, disk interface/ECC controller 203 and over path 106 extending to disk drive assembly 107. It has also been described how the serving of a host read request involves the transmission of signals from the host to the disk drive assembly specifying the memory location to be read as well as the transfer from the disk drive assembly back to the host of the data read from the disk drive assembly in response to the reception of the host read request. It has further been described how the information and data that is exchanged between the host and the disk drive assembly on read/write requests is not transmitted directly through buffer memory controller 202, but instead, it is transferred from buffer memory controller 202 to buffer memory 104 on a write operation and is then subsequently read out of buffer memory 104 and transferred to either the host or the disk drive assembly depending upon the direction of data flow. The following describes in greater detail the function of buffer memory 104 in the serving of host read and write requests.

The serving of host read and write requests involves the use of buffer memory 104 not only to exchange data between host 101 and disk drive assembly 107, but to apply information at selected times to the various circuits shown on FIG. 3. The serving of each host request involves the sequential connection of buffer memory 104 to the various circuits shown on FIG. 3. Buffer memory multiplexor 301 comprises a multi-port multiplexor which, on its lower side, is connected to the various circuits of FIG. 3 that require a connection to buffer memory 104. The top side of buffer memory multiplexor 301 is connected over bus system 105 to buffer memory 104. In the serving of host requests, buffer memory multiplexor 301 is controlled by circuits in 301 and the other circuits shown on FIG. 3 to establish a plurality of connections, one at a time, from the various inputs of multiplexor 301 to the output of multiplexor 301 and, in turn, to buffer memory 104.

Path 212 connects host interface controller 201 to an input of buffer multiplexor 301. Buffer memory multiplexor 301 detects the reception of a request by host interface controller 201 and causes input 212 of multiplexor 301 to be connected to the output of multiplexor 301 and over bus system 105 to buffer memory 104.

If the host request represents a read request, buffer memory multiplexor 301 causes the data read out of disk drive assembly 107 to be written into buffer memory 104. Path 214 is then disconnected from the input of multiplexor 301 and path 212 is connected through the multiplexor and to buffer memory 104. Path 212 receives the data read from the buffer memory 104 and extends this data through fifo 308 and host interface control logic 310 to host 101.

If the host request represents a write request, buffer memory multiplexor 301 causes the data received from the host to be written into buffer memory 104. Path 212 is then disconnected from the multiplexor 301 and path 214 is connected through the multiplexor to buffer memory 104 over bus system 105. Path 214 receives the data read from the buffer memory 104 and extends this data through fifo 311 and then through disk interface/ECC control logic 321 to disk drive assembly 107.

To support both write or read requests from the host to the disk drive assembly 107, specific servo data is stored in buffer memory 104 to specify the disk drive assembly media track format. The servo data is transferred to disk interface/ECC control logic 321 through servo data FIFO 309 and path 313. For the host write operation, when the multiplexer disconnects path 212 after transferring a portion of host data to buffer memory and is ready to transfer the data to disk drive assembly 107, servo data path 313 is connected first before the disk data path 314 is transmitted. The servo data is transferred through over path 313 and FIFO 309 to disk interface/ECC control logic 321. Path 313 is disconnected and data path 314 is connected to the buffer memory. Using this servo data, the disk data is written in the correct location on the disk drive assembly. When the host request is a read request, servo data path 313 is first connected to buffer memory 104. The servo data is used to locate the disk data on the disk drive assembly. Then, the disk data path 314 is connected to transfer the data from disk drive assembly 107 to buffer memory 104.

If this host request represents a read request and there is read error detected by the disk interface/ECC control logic 321, ECC data path 315 and FIFO 312 are connected to the buffer memory 104 at a time when there is no connection from buffer memory 104 to the servo data path 313 and disk data path 314. The ECC correction is done by using the ECC data path 315 to buffer memory 104. The ECC control logic fetches the data from buffer memory and performs necessary correction procedures. The ECC control logic then writes the data back to buffer memory 104 through the path 315.

If buffer memory 104 is a DRAM device, memory refreshing is required to prevent data loss. Path 307 extending from DRAM refresh control logic 303 is periodically enabled and extended through multiplexor 301 to buffer memory 104 over the address bus 105 to provide the required refresh signals to buffer memory 104.

Microprocessor 111 also can be connected through multiplexer 301 to access buffer memory 104. Data in buffer memory 104 can be read or written by microprocessor over bus 209. This path is connected to the multiplexer if there are no other connection at the time. It has the lowest priority.

The present invention solves the data tracing and logging problem by providing tracing control logic 302 in buffer memory controller 202. ROM 112 provides the firmware to support the data tracing and logging function. The tracing function is enabled when tracing control logic 302 and microprocessor 111 receive a request from a developer through terminal 110. Specific program address or data can be passed to tracing control logic 302 from terminal 110. Then the tracing control logic 302 can monitor the data or address busses for the presence of these specific program addresses or data once it is enabled. When the program in ROM 112 is stepped through the specified program addresses to be tested and, in response to the advancement of each step through the program, tracing control logic 302 extends the signals on the address and data busses to a trace data segment of buffer memory 104 where they are recorded and written for further use by the developers. In so doing, tracing control logic 302 reads the specified data and address bus signals 209, extends them through tracing data fifo 305 and over paths 304 which is an input to multiplexor 301. This input is activated when required to extend the tracing data through the multiplexor and over path 105 for recording in a specified segment of buffer memory 104.

Terminal 110 is connected via bus 109 and serial port 204 to the data address and control busses of bus system 209. Terminal 110 is provided primarily for testing purposes and its connections to bus system 209 enable the designers and testing personnel to communicate with microprocessor 111 and the other elements of disk controller 103 in order to facilitate the testing required during the development and testing phases of disk controller 103.

Figure 4:
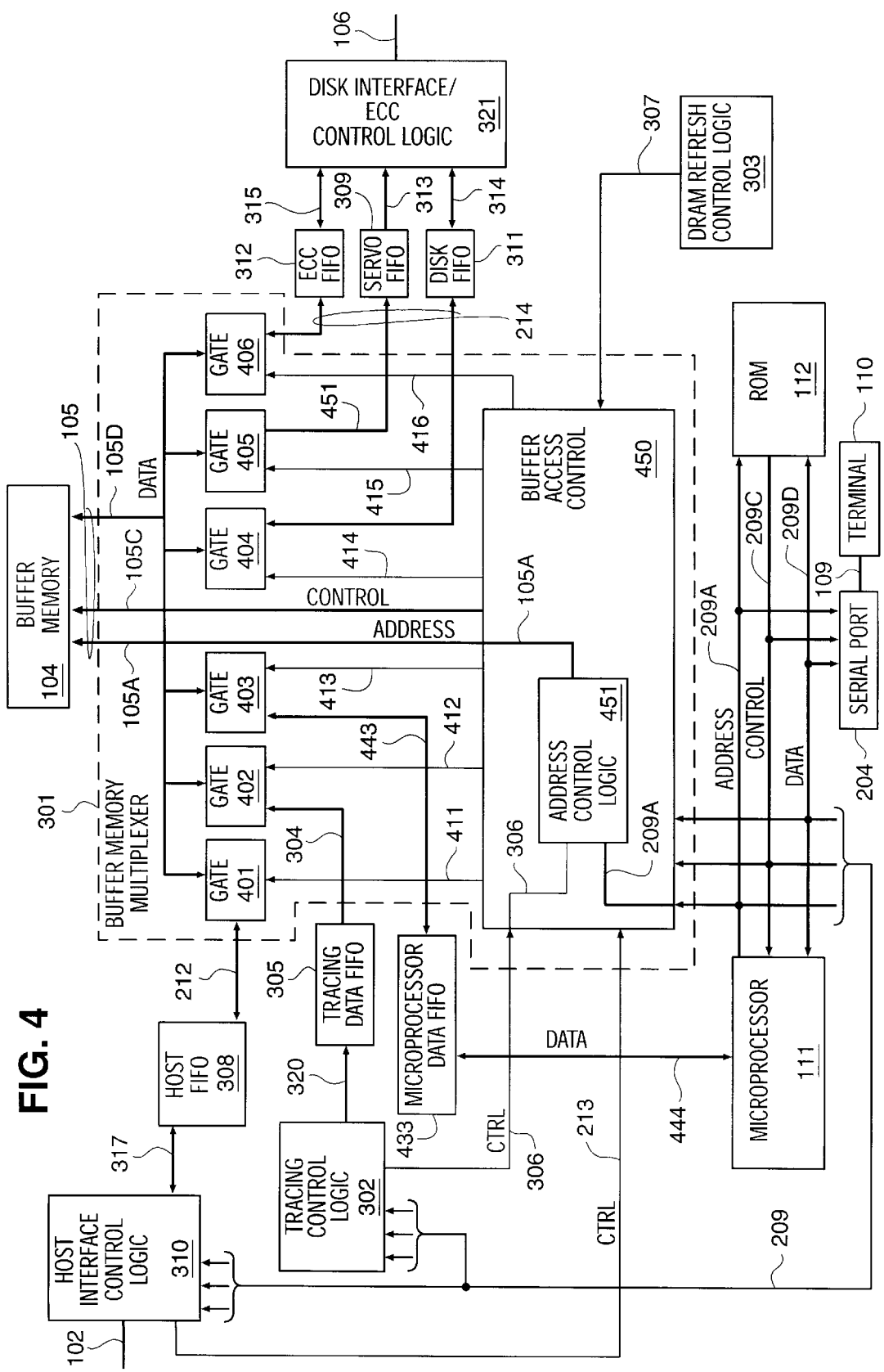
FIG. 4 discloses further details of the buffer memory multiplexor 301 of FIG. 3.

Description of FIG. 4

FIG. 4 describes further details of buffer memory multiplexor 301 of FIG. 3 as well as disk controller 103. FIG. 4 shows host interface control logic 310 and its associated fifo 308 which receives requests from host 101 over path 102. The system of FIG. 4 further includes microprocessor 111, terminal 110 and its associated serial port 204 and ROM 112. FIG. 4 further includes disk interface/ECC control logic 321 which is connected over path 106 to disk drive assembly 107. FIG. 4 further includes buffer memory 104 which is connected by bus system 105 to gates 401–406.

Buffer memory multiplexor 301 on FIG. 3 comprises the elements shown within rectangle 301 on FIG. 4. These elements include buffer access control 450 and gates 401–406. Gates 401–406 comprise a six input multiplexer and each gate may be activated one at a time to connect its input through the multiplexor to buffer memory 104 via data bus 105D. Each gate 401–406 has a data input and a control lead which, when activated, connects its data input over data bus 105D to buffer memory 104. "BI-directional" gate 401 serves host interface control logic 310 and its associated fifo 308 and when activated by a signal on path 411, connects path 212 through gate 401 and over data bus 105D to buffer memory 104. Gate 402 serves tracing data fifo 305 and when gate 402 is activated by a signal on path 412, extends data on path 304 through gate 402 and over data bus 105D to buffer memory 104. Gate 403 serves microprocessor data fifo 433 and when gate 403 is activated by a signal on path 413, it connects microprocessor data fifo 433 over path 443 through gate 403 to buffer memory 104.

Gate 404 is activated by a signal on path 414 and at such times, it connects disk interface/ECC control logic 321 via fifo 311 to buffer memory 104. At such times, information can be exchanged on a read or write operation between buffer memory 104 and disk drive assembly 107. Gate 405 is activated by a signal on path 415 at such time connects fifo 309 with disk interface/ECC control logic 321 to transmit servo data from buffer memory 104 to disk interface/ECC control logic 321. Gate 406 is activated by a signal on path 416 to connect ECC fifo 312 with buffer memory 104. This connection enables buffer memory 104 to exchange ECC information with disk interface/ECC control logic 321.

A multiple level of enabling control is used depending on the product operation mode, such as normal function mode, self monitoring mode, or program debugging mode. Embedded hardware monitors the internal program and data address bus lines of the processor. A defined range of program addresses or data content can be programmed into tracing control logic 302. A defined range of data content on data bus 209D is useful for debugging since this enables the data addresses and content to be logged into buffer memory 104 when embedded microprocessor 111 reads or writes this address range. If a certain program address is critical for troubleshooting, the logging function is triggered when the embedded processor 111 fetches the instruction from this address.

The data structure for the traced data can be specified by a certain prefix for program addresses and another prefix for data addresses. Additional information, such as microprocessor read or write operation can also be logged. The next trace entry in the data structure can be based on program instruction or data content. Depending on the application, various types of data structure can be used.

Figure 5:
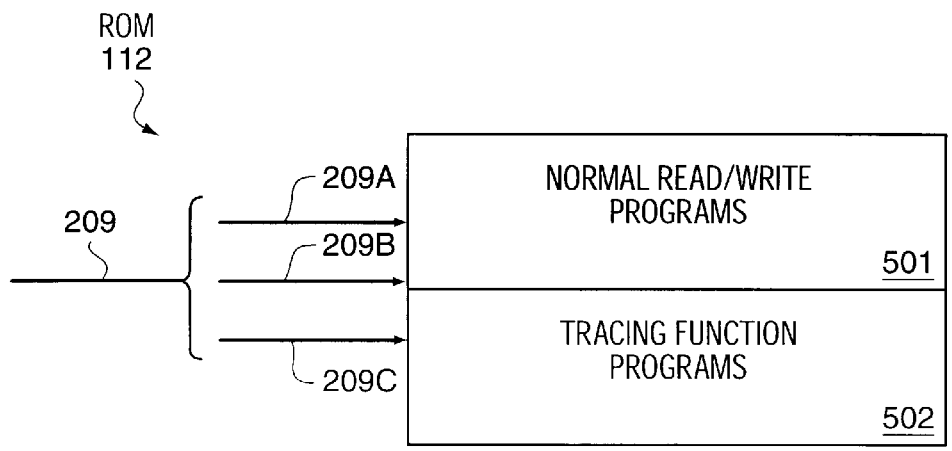
FIG. 5 discloses further details of ROM 112.

Description of FIG. 5

FIG. 5 discloses further details of ROM 112. ROM 112 is subdivided into two segments. The first segment is entitled normal read/write programs and numbered 501. The second segment is entitled tracing function program 502. ROM operates under control of signals on address bus 209A, control bus 209C, and data bus 209D.

ROM segment 501 is used during the normal read/write functions of the disk controller in which data is exchanged between host 101 and disk drive assembly 107. ROM segment 502 is used in connection with microprocessor 111 to control the operation of the system in tracing information on address bus 209A and data bus 209D and controllably entering it into buffer memory 104 via tracing control logic 302, tracing data fifo 305 and gate 402.

Figure 6:
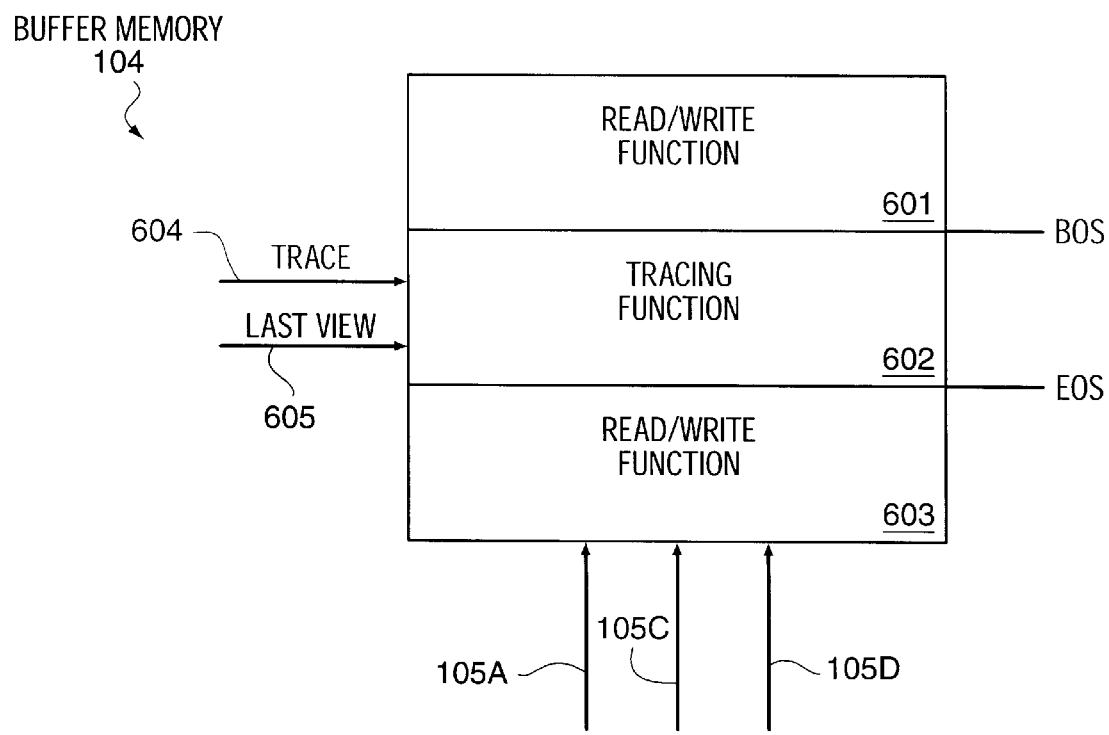
FIG. 6 discloses further details of buffer memory 104.

Description of FIG. 6

FIG. 6 discloses further details of buffer memory 104 which as shown on FIG. 6, is divided into a read/write function 601, a tracing control function 602, and an additional read/write function 603. The read/write function segments 601 and 603 store the information and data required in the exchange of data between the host 101 and disk drive assembly 107 via the disk controller 103 of the present invention. Tracing function segment 602 stores address and data written into buffer memory 104 under control of the tracing circuitry of the present invention.

The beginning address of the tracing function segment 602 is identified on FIG. 6 as BOS while the ending address of segment 602 is identified as EOS. Tracing function segment 602 is associated with software pointers 604 and 605. Pointer 604 is termed the trace pointer; pointer 605 is termed the last view pointer.

Both pointers 604 and 605 are movable. Both pointers are initialized to the BOS address. When a tracing function is performed, information is written into segment 602 location by location and the trace pointer 604 moves from position to position. When the trace pointer 604 reaches the end of segment address EOS, it wraps around the segment and goes back to the BOS address and then continues advancing from there.

Last view pointer 605 does not advance in unison but with the trace pointer 604. However, at the end of a tracing operation when the user wishes to view or retrieve the information that was stored in segment 602, last view pointer 605 advances location by location and remains at the location in segment 602 that represents the last information that was retrieved by an operator at terminal 110.

After tracing pointer 604 enters information into a portion of memory segment 602, say the first half, the user, can read this information out when the logging or tracing is finished. The last view pointer is then active and when the last view pointer reaches the location of the trace pointer 604, this indicates that all of the information that was traced and stored had been retrieved and that no additional information is available.

Let it be assumed that pointers 604 and 605 are initially at the same location of segment 602. Assume that a new trace starts and trace pointer 604 advances as information is entered into segment 602. When the trace pointer 604 reaches the EOS address, it wraps back to the BOS address and the writing of new information continues up to the point where the address of trace pointer 604 matches that of last view pointer 605. At this time, the trace command originally generated by user at terminal 110 may let the trace pointer 604 continue logging and overwrite the information it just wrote. As an alternative, the command generated by the user may not permit overwrite and in that case, when the call trace pointer reaches the location of the last view pointer, call tracing and logging stops and information is not overwritten. If information overwrite is permitted, the tracing and logging operation will continue and new data will be entered into segment 602 until the user terminal 110 issues a command to stop the operation.

Trace pointer 604 and last view pointer 605 are software pointers generated by the microprocessor 110 and written into tracing control logic 302 to tell the tracing function to stop at a specified address, namely to tell the tracing control logic that when the tracing pointer 605 equals the last view pointer 604 that tracing control logic should not send to any further addresses via the tracing data fifo 305 to buffer memory 104.

Description of FIG. 7

FIG. 7 discloses further details of tracing control logic 302. This element comprises address tracing logic 701, data tracing logic 702, logic control 703, address logic 708, and multiplexor 707. Address logic receives the addresses of address bus 209A and data bus 290D that are to be traced and information therefore entered into buffer memory 104. Logic control 703 and address logic 708 receive control signals from control bus 209C and CTRL path 306 to control the operation of tracing control logic circuit 302 in performing its address and data tracing and logging functions. One such function performed by logic control 703 is to apply the necessary signals to multiplexor 707 so that either path 704 from address tracing logic 701 or path 705 from data tracing logic element 702 is extended through multiplexor 707 to output path 302 extending through the circuitry shown on FIGS. 3 and 4 to buffer memory 104. Control logic 302 also receives address signals from bus 209A and data from bus 209D.

The following describes how disk controller 103 performs tracing and logging functions.

---

1. It can trace and log all and program addresses currently being executed by microprocessor 111.
2. It can trace and log specified addresses on address bus 209A.
3. It can trace and log specific data on data bus 209A.
4. It can log a range of addresses on address bus 209A.
5. It can log a range of data on the data bus 209D.
6. It can perform selected combinations and multiples of the above 5 described functions.

---

Let it be assumed that a user at terminal 110 desires to trace an occurrence of ROM 112 address 103 on address bus 209A. This being the case, the user at terminal 110 sends a trace command to microprocessor 111 over bus system 209 specifying that ROM 112 address 103 is to be traced. Microprocessor 111 receives the trace command and sends commands over bus system 209 to ROM 112 to access the tracing program portion 502 of ROM 112 as shown in FIG. 5. Microprocessor 111 executes the tracing program and causes signals to be sent over bus 209 to tracing control logic 302 which is shown in further detail on FIG. 7. The address signals on bus 209A are applied to address tracing logic 701 as well as logic control 703 and in particular, to address logic element 708 within logic control 703. Address logic 708 stores the address 103 that is to be traced.

Microprocessor 111 then resumes its normal functions of controlling the circuitry on FIG. 4 for the serving of host read and write commands in which data is exchanged between host 101 and disk drive assembly 107 as described. In serving the normal functions of disk controller 103, microprocessor 111 executes the normal read/write programs in segment 501 of ROM 112 as shown on FIG. 5. Operations continue with normal read/write functions being served until such time as microprocessor 111 addresses a program in ROM segment 501 having an address of 103. This is the address that the system is now conditioned to trace. At this time, address logic 708 and the remainder of logic control 703 detects the appearance of ROM address 103 on bus 209A. In response to this detection, logic control 703 applies a signal to path 706 to interconnect multiplexor input 704 with multiplexor output 320. At the same time, logic control sends a signal over path 710 to activate gates in address tracing logic 701. The activation of these gates causes them to extend address 103 on bus 209A through address tracing logic 701, over path 704, multiplexor 707, path 320 to tracing data fifo 305. From there, it is extended over path 304, and through gate 402 and data path 105D to buffer memory 104 where it is written into the tracing function segment 602 of buffer memory 104 as shown on FIG. 6.

If the buffer memory segment 602 on FIG. 6 is initially empty, trace pointer 604 is at segment address BOS. When ROM program address 103 is executed, information is written for address 103 into buffer memory segment 602 beginning at the BOS. Next program address 104 is executed and written into segment 602. This continues until EOS is reached. The tracing pointer then wraps around back to BOS. There are two modes of tracing. The first is continuous tracing operation which continues tracing until the user stops it. The second mode is that tracing is stopped when the trace pointer 604 location indicates the address of last view pointer 605.

The trace and last view software pointers 604 and 605 are controlled by address control logic 451 which applies the necessary addresses to path 105A shown on FIG. 4 extending to buffer memory 104 to cause the ROM address 103 to be written into an address of tracing function segment 602 of buffer memory 104 on FIG. 6. Once the specified ROM address 103 is detected on address bus 209A, tracing control logic 302 and it's address logic 708, respond to this detection by sending a signal over CRTL path 306 to address control logic 451 on FIG. 4. Under normal operations, in which tracing functions are not being executed, address control logic receives address generated by microprocessor 111 and applied to address bus 209A. It extends these signals over address bus 105A to buffer memory 104A to control the writing of data associated with host read and write requests into buffer memory 104 and in particular, into read and write functions 601 and 603 of buffer memory 104. However, when a specified ROM address 103 that is to be traced is detected by address logic 308, address control logic 451 is notified of this detection by the signal on path 306 from tracing control logic 302 and asserts control of the addressing of buffer memory 104 and causes the detected ROM address 103 to be written into the appropriate address of tracing function segment 602 of buffer memory 604. Following the writing of ROM address 103 into buffer memory 104, the system reverts to its normal operation and serves host read and write requests. At this time, control of the addressing of buffer memory 104 is returned to microprocessor 111 and the addresses received by address control logic 451 are extended by it from address bus 209A to address bus 105A extending to buffer memory 104.

If a continuation of logging is desired, logging will not stop and the trace pointer moves until stopped by the user. Continuous logging is stopped when terminal 110 and serial port 204 send a stop command to microprocessor 111 which communicates with ROM 112 to execute a stop program for tracing. This sends the necessary signals up over bus system 209 to tracing control logic 302 to terminate the tracing operation. When tracing is stopped, the trace information is still in buffer memory 104.

The traced addresses stored in tracing function segment 602 of buffer memory 104 may be retrieved under control of a user at terminal 110 who generates a read out command which is extended through serial port 204 over the bus system 209 to microprocessor 111. Microprocessor addresses the tracing function segment 502 of ROM 112 to execute the read out command. In so doing, signals are sent to address control logic 451 to cause it to read out the tracing function segment 602 of buffer memory 104. The data that is read out is applied by buffer memory 104 to data bus 105D and extended through gate 403 which is activated at this time over path 413 by buffer access control 450. The read out data extended through gate 403, is applied over path 443 to microprocessor data fifo 433 and from there over path 444 to microprocessor 111. The microprocessor then extends the data over data bus 209D, and serial port 204 to terminal 110.

A user at host 101 may also initiate a trace operation and a subsequent data read out operation in a manner similar to that just described for terminal 110. In this case, the host initiated trace command is received by host interface control logic 310 and extended to microprocessor 111 over bus 209. The trace command is received by microprocessor 111 and executed by it in the manner described for a trace command initiated by terminal 110. Subsequently, a user at host 101 may retrieve the trace information from segment of 602 of buffer memory 104. The read out of buffer memory of 104, at this time, causes the traced data to be applied to data bus 105D, extended through gate 401 which is activated at this time by path 411 and buffer access control and applied to over path 212 to host fifo 308. From there, the read out trace data is extended over path 317 and host interface control logic 310 and back to host 101 over path 102.

The preceding has described the tracing of a single ROM address 103. The tracing facilities of the present system permit other types of tracing as above described. Namely, continuous tracing, the tracing of a sequence comprising a plurality of ROM addresses, or the tracing of specified data on data bus 209D rather than specified addresses on address bus 209A. Logic control element 703, and its address logic 708 contains the necessary registers comparators and logic to permit continuous tracing to be done, to permit a range of addresses to be traced as well as the tracing of a single specified address such as 103 as already described.

If the system has sufficient band width capabilities it can handle tracing and logging functions as well as normal functions. On the other hand, if sufficient spare band width does not exist, then it can't do, simultaneously, both normal functions and tracing functions. In that case, the only program information that is logged and traced are programs that involve branch conditions. This branch condition information is useful by the terminal and its operator to analyze system conditions.

When specific data on data bus 209D is to be traced, signals to this effect are sent over bus system 209 to logic control 703 which, in turn, sends an activation signal over path 709 to data tracing logic 702 to prepare it for the detection of the specified data on bus path 209D. Logic control 703 causes a signal to be sent over path 706 to multiplexor 707 to cause it to interconnect its input 705 from data tracing logic 702 with its output on path 320. The specified data is detected and extended through data tracing logic 702, over path 705 and through multiplexor 707 to path 320 and the remainder paths previously described to cause it to be written into the appropriate address and tracing function segments 602 of buffer memory 104.

The disk controller comprising the subject matter of this invention is an improvement of a disk controller manufactured by Adaptec, Inc. of 691 South Milpitas Boulevard, Milpitas, Calif. 95035. This Adaptec, Inc. disk controller is disclosed in a manual dated Sep. 10, 1997 and entitled AIC-5460A Drive Manager chip. The contents of this manual are hereby incorporated by reference into the present application to the same extent as if fully set forth herein. This manual is available upon request by writing to Adaptec, Inc. at the above address.

It is to be expressly understood that the claimed invention is not to be limited to the description of the preferred embodiment but encompasses other modifications and alterations within the scope and spirit of the inventive concept.

We claim:

1. A method of testing a chip having embedded circuitry devoid of a direct connection external to said chip; said method comprising the steps of:

programming a tracing means embedded on said chip to detect the presence of specified information on a bus system embedded on said chip, wherein said bus system is devoid of a direct connection external to said chip;

operating an address comparator in said tracing means to detect the presence of said specified information on said bus system;

opening a gating means in said tracing means in response to said detection;

extending said specified information on said bus system through said gating means to a buffer memory;

writing said specified information into said buffer memory in response to said extension;

reading out said specified information from said buffer memory; and extending said readout information to a user terminal external to said chip.

2. A method of testing a chip having embedded circuitry devoid of a direct connection external to said chip;

wherein said embedded circuitry includes a processor for controlling the operation of said circuitry on said chip and further includes a bus system connecting said processor to a tracing means; said bus system comprising a data bus and an address bus; said method comprising the steps of:

programming said tracing means embedded on said chip to detect the presence of specified information on said bus system, wherein said bus system is devoid of a direct connection external to said chip;

sending a tracing command to said processor specifying that a specified address on said bus system is to be traced;

sending said specified address from said processor to said tracing means;

storing said specified address in an address register in said tracing means for detecting a subsequent appearance of said specified address on said bus system;

operating an address comparator in said tracing means to detect the presence of said specified information on said bus system;

opening a gating means in said tracing means in response to said detection;

extending said specified information on said bus system through said gating means to a buffer memory;

writing said specified information into said buffer memory in response to said extension;

reading out said specified information from said buffer memory; and extending said readout information to a user terminal external to said chip.

3. A method of testing a chip having embedded circuitry devoid of a direct connection external to said chip; said method comprising the steps of:

programming a tracing means embedded on said chip to detect the presence of specified information on a bus system embedded on said chip, wherein said bus system is devoid of a direct connection external to said chip;

operating an address comparator in said tracing means to detect the presence of said specified information on said bus system;

opening a gating means in said tracing means in response to said detection;

extending said specified information on said bus system through said gating means to a buffer memory;

operating said buffer memory external to said chip;

writing said specified information into said buffer memory in response to said extension;

reading out said specified information from said buffer memory; and extending said readout information to a user terminal external to said chip.

4. A method of testing a chip having embedded circuitry devoid of a direct connection external to said chip; said method comprising the steps of:

programming a tracing means embedded on said chip to detect the presence of specified information on a bus system embedded on said chip, wherein said bus system is devoid of a direct connection external to said chip;

operating an address comparator in said tracing means to detect the presence of said specified information on said bus system;

opening a gating means in said tracing means in response to said detection;

extending said specified information on said bus system through said gating means to a buffer memory;

operating said buffer memory embedded on said chip;

writing said specified information into said buffer memory in response to said extension;

reading out said specified information from said buffer memory; and extending said readout information to a user terminal external to said chip.

5. The method of claim 2 wherein a plurality of multiplexor gates are connected to said buffer memory; and wherein said step of extending comprises the steps of:

opening an multiplexor gate individual to said tracing means; and extending said specified information from said tracing means through said multiplexor gate to said buffer memory.

6. The method of claim 5 wherein said step of reading out includes the steps of:

opening an multiplexor gate unique to said processor;

extending said readout information through said last named multiplexor gate to said processor; and extending said readout information from said processor to said user terminal external to said chip.

7. The method of claim 2 wherein said step of programming said tracing means comprises the steps of:
   storing user programs in a first portion of a ROM;
   storing tracing programs in a second potion of said ROM;
   operating said processor under control of said user programs when said processor is not executing a tracing operation; and
   operating said processor under control of said tracing programs in said ROM when said processor is executing a tracing operation.

8. The method of claim 7 further including the steps of:
   activating a tracing program in said ROM in response to the reception of said tracing command by said processor;
   executing said tracing program in said ROM under control of said processor to program said tracing means.

9. A method of testing a chip having embedded circuitry devoid of a direct connection external to said chip; said method comprising the steps of:
   programming a tracing means embedded on said chip to detect the presence of specified information on a bus system embedded on said chip, wherein said bus system is devoid of a direct connection external to said chip;
   operating an address comparator in said tracing means to detect the presence of said specified information on said bus system;
   opening a gating means in said tracing means in response to said detection;
   extending said specified information on said bus system through said gating means to a buffer memory, said buffer memory has a first segment for serving host request and a second segment for serving tracing functions;
   writing said specified information into said buffer memory in response to said extension;
   reading out said specified information from said buffer memory; and
   extending said readout information to a user terminal external to said chip.

10. An apparatus for testing a chip having embedded circuitry devoid of a direct connection external to said chip; said apparatus comprising:
    programming tracing means embedded on said chip to detect the presence of specified information on a bus system embedded on said chip and devoid of a direct connection external to said chip;
    an address comparator in said tracing means for detecting the presence of said specified information on said bus system;
    means for opening gating means in said tracing means in response to said detection;
    means for extending said specified information on said bus system through said gating means to a buffer memory;
    means for writing said specified information into said buffer memory in response to said extension
    means for reading out said specified information from said buffer memory; and
    means for extending said readout information to a user terminal external to said chip.

11. An apparatus for testing a chip having embedded circuitry devoid of a direct connection external to said chip; wherein said embedded circuitry includes a processor for controlling the operation of said circuitry on said chip and further includes a bus system connecting said processor to a tracing means; said bus system comprising a data bus and an address bus; said apparatus comprising:
    programming tracing means embedded on said chip to detect the presence of specified information on said bus system embedded on said chip and devoid of a direct connection external to said chip;
    means for sending a command to said processor specifying that a specified address on said bus system is to be traced;
    means for sending said specified address to said tracing means;
    means for storing said specified address in an address register in said tracing means for detecting a subsequent appearance of said specified address on said bus system;
    an address comparator in said tracing means for detecting the presence of said specified information on said bus system;
    means for opening gating means in said tracing means in response to said detection;
    means for extending said specified information on said bus system through said gating means to a buffer memory;
    means for writing said specified information into said buffer memory in response to said extension;
    means for reading out said specified information from said buffer memory; and
    means for extending said readout information to a user terminal external to said chip.

12. The apparatus of claim 11 wherein said buffer memory is external to said chip.

13. The apparatus of claim 11 wherein said buffer memory is embedded on said chip.

14. The apparatus of claim 11 wherein a plurality of multiplexor gates are connected to said buffer memory; and wherein said means for extending comprises:
    means for opening an multiplexor gate individual to said tracing means; and
    means for extending said specified information from said tracing means to said buffer memory.

15. The apparatus of claim 14 wherein said means for reading out includes:
    means for opening an multiplexor gate unique to said processor;
    means for extending said readout information through said last named multiplexor gate to said processor; and
    means for extending said readout information from said processor to said user terminal external to said chip.

16. The apparatus of claim 11 wherein said means for programming said tracing means comprises:
    means for storing user programs in a first portion of a ROM;
    means for storing tracing programs in a second potion of said ROM;
    means for operating said processor under control of said user programs when said processor is not executing a tracing operation;
    means for operating said processor under control of said tracing programs in said ROM when said processor is executing a tracing operation.

17. The apparatus of claim 16 further including:
    means for activating a tracing program in said ROM in response to the reception of said tracing command by said processor;

means for executing said tracing program under control of said processor to program said tracing means.

18. An apparatus for testing a chip having embedded circuitry devoid of a direct connection external to said chip; said apparatus comprising:

programming tracing means embedded on said chip to detect the presence of specified information on a bus system embedded on said chip and devoid of a direct connection external to said chip;

an address comparator in said tracing means for detecting the presence of said specified information on said bus system;

means for opening gating means in said tracing means in response to said detection;

means for extending said specified information on said bus system through said gating means to a buffer memory, said buffer memory has a first segment for serving host request and a second segment for serving tracing functions;

means for writing said specified information into said buffer memory in response to said extension;

means for reading out said specified information from said buffer memory; and means for extending said readout information to a user terminal external to said chip.

19. Apparatus for testing a chip having embedded circuitry that is devoid of direct connections external to said chip; said embedded circuitry comprising:

a processor for controlling the operation of said circuitry;

tracing means separate from said processor;

a memory a bus system interconnecting said processor and said tracing means;

means for programming said tracing means to detect the presence of specified information on said bus system;

means including said tracing means for detecting the presence of said specified information on said bus system;

means including said tracing means for writing said specified information on said bus system into said buffer memory in response to said detection; and means for reading out said specified information from said buffer memory; and means for applying said readout information to a user terminal.

20. An apparatus for testing a chip having embedded circuitry devoid of a direct connection external to said chip; said apparatus comprising:

an interface for receiving read/write requests from a host;

programming tracing means embedded on said chip to detect the presence of specified information on a bus system embedded on said chip and devoid of a direct connection external to said chip;

an address comparator in said tracing means for detecting the presence of said specified information on said bus system;

means for opening gating means in said tracing means in response to said detection;

means for extending said specified information on said bus system through said gating means to a buffer memory;

a multiplexor connected to said buffer memory;

a disk drive;

means responsive to the reception by said interface of a request from said host for controlling said multiplexor to connect said host with said buffer memory through said multiplexor;

means for writing information pertaining to said host request into said buffer memory via said multiplexor;

means for writing said specified information into said buffer memory in response to said extension;

means including said multiplexor responsive to said writing for disconnecting said interface from said buffer memory and for connecting a disk drive through said multiplexor with said buffer memory;

means for transmitting said information in said buffer memory pertaining to said host request from said buffer memory to said disk drive;

means for connecting said tracing means via said multiplexor to said buffer in response to the presence of said specified information on said bus system;

said tracing means being effective when connected to said buffer memory for writing said specified information into said buffer memory;

means for reading out said specified information form said buffer memory; and means for extending said readout information to a user terminal external to said chip.

21. An apparatus for testing a chip having embedded circuitry devoid of a direct connection external to said chip; said apparatus comprising:

programming tracing means embedded on said chip to detect the presence of specified information on a bus system embedded on said chip and devoid of a direct connection external to said chip;

an address comparator in said tracing means for detecting the presence of specified information on said bus system, wherein said address comparator defines means for detecting a specified address on said bus system;

means for opening gating means in said tracing means in response to said detection;

means for extending said specified information on said bus system through said gating means to a buffer memory;

means for writing said specified information into said buffer memory in response to said extension;

means for reading out said specified information from said buffer memory; and means for extending said readout information to a user terminal external to said chip.

22. An apparatus for testing a chip having embedded circuitry devoid of a direct connection external to said chip; said apparatus comprising:

programming tracing means embedded on said chip to detect the presence of specified information on a bus system embedded on said chip and devoid of a direct connection external to said chip;

an address comparator in said tracing means for detecting the presence of specified information on said bus system, wherein said address comparator defines means for detecting a plurality of specified addresses on said bus system;

means for opening gating means in said tracing means in response to said detection;

means for extending said specified information on said bus system through said gating means to a buffer memory;

means for writing said specified information into said buffer memory in response to said extension;

means for reading out said specified information from said buffer memory; and means for extending said readout information to a user terminal external to said chip.

23. An apparatus for testing a chip having embedded circuitry devoid of a direct connection external to said chip; said apparatus comprising:

programming tracing means embedded on said chip to detect the presence of specified information on a bus system embedded on said chip and devoid of a direct connection external to said chip;

an address comparator in said tracing means for detecting the presence of specified information on said bus system, wherein said address comparator defines means for detecting a range of specified addresses on said bus system;

means for opening gating means in said tracing means in response to said detection;

means for extending said specified information on said bus system through said gating means to a buffer memory;

means for writing said specified information into said buffer memory in response to said extension;

means for reading out said specified information from said buffer memory; and means for extending said readout information to a user terminal external to said chip.

* * * * *